(Model.)
A. STENGER.
HARNESS ROSETTE, DOOR PLATE, &c.
No. 291,418. Patented Jan. 1, 1884.
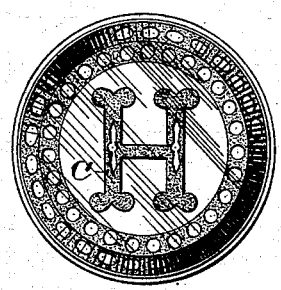
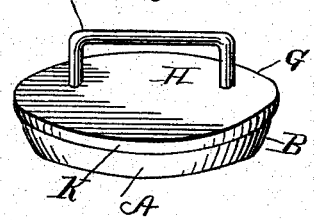
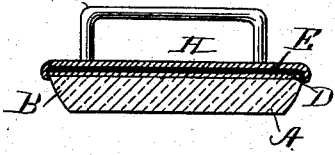
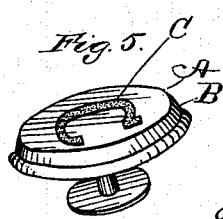
Witnesses:
Wm. H. Bates.
R. T. Campbell
Inventor:
Andrew Stenger,
T. C. Woodward,
Attorney.

United States Patent Office.

ANDREW STENGER, OF BROOKLYN, NEW YORK.

HARNESS-ROSETTE, DOOR-PLATE, &c.

SPECIFICATION forming part of Letters Patent No. 291,418, dated January 1, 1884.

Application filed July 23, 1883. (Model.)

*To all whom it may concern:*

Be it known that I, ANDREW STENGER, of Brooklyn, New York, have invented certain new and useful Improvements in Harness-Rosettes, Door-Plates, and the like, set forth in this specification and the drawings thereof.

The invention consists in improvements relating to the construction and the ornamental effect produced thereby.

Figure 1 is a plan view of one form of the invention. Fig. 2 is a perspective view of the same. Fig. 3 is a cross-section thereof.

In the form of construction shown, a glass plate, A, of some desirable shape, has a beveled edge, B. On the back of the glass plate A is etching C, of some letter, design, name, or desirable figure.

Over the etching C and the back of the glass plate A is secured, by suitable adhesive solution or mucilage, gold leaf, or any suitable metallic leaf, D. The back of the metallic leaf D is coated with a coating, E, of asbestus composition or other suitable composition, to protect the metallic leaf D, the etching C, and the glass plate A.

For door-plates F and other plates, the glass plate A, the metallic leaf D, and the coating E have perforations for screws or nails with which to fasten the plates.

For harness-rosettes G, a back plate, H, having a flange, K, and a loop, L, is preferable, as the back plate affords protection, the flange K holds the glass plate A, and the loop L serves for attachment.

The glass plate A and the etching C appear to be the color of the metallic leaf, and the general effect is striking and ornamental.

The details of construction may be varied within the scope of the improvements.

I claim as my invention—

1. The combination of a glass plate having a beveled edge and an etched back, covered with metallic leaf coated with asbestus composition, substantially as set forth.

2. The combination of a glass plate having an etched back covered with metallic leaf coated with a protecting composition, substantially as set forth.

3. The combination of a glass plate covered with metallic leaf coated with a protecting composition, substantially as set forth.

4. The combination of a glass plate covered with metallic leaf coated with a protecting composition, and a back plate having a flange to hold the glass plate, and a loop for attachment, substantially as set forth.

In testimony whereof I hereunto subscribe my signature, in the presence of two witnesses, in the city, county, and State of New York, the 29th day of March, 1883.

ANDREW STENGER.

Witnesses:
M. PARPART,
OTTO E. FIGGE.